United States Patent
Bonacci et al.

(10) Patent No.: US 8,820,215 B2
(45) Date of Patent: Sep. 2, 2014

(54) DEVICE FOR PREPARING A BEVERAGE COMPRISING AN ADJUSTABLE CLOSING MECHANISM

(75) Inventors: Enzo Bonacci, Savigny (CH); Jean-Luc Denisart, Cully (CH); Christian Talon, Vufflens-le-Chateau (CH); HansPeter Pleisch, Corseaux (CH)

(73) Assignee: Nestec S.A., Vevey (CH)

( * ) Notice: Subject to any disclaimer, the term of this patent is extended or adjusted under 35 U.S.C. 154(b) by 835 days.

(21) Appl. No.: 12/747,577

(22) PCT Filed: Dec. 15, 2008

(86) PCT No.: PCT/EP2008/067507
§ 371 (c)(1),
(2), (4) Date: Jul. 20, 2010

(87) PCT Pub. No.: WO2009/077486
PCT Pub. Date: Jun. 25, 2009

(65) Prior Publication Data
US 2010/0275787 A1 Nov. 4, 2010

(30) Foreign Application Priority Data
Dec. 18, 2007 (EP) .................................... 07123482

(51) Int. Cl.
*A47J 31/00* (2006.01)
*A47J 31/06* (2006.01)
*A47J 31/36* (2006.01)

(52) U.S. Cl.
CPC .................................. *A47J 31/3676* (2013.01)
USPC .............................. 99/295; 99/275; 99/289 R

(58) Field of Classification Search
USPC ......... 99/280, 289 P, 289 R, 291, 295, 302 P; 221/92, 113, 119–121, 199, 215, 273, 221/275, 309; 269/66, 196, 204, 235
See application file for complete search history.

(56) References Cited

U.S. PATENT DOCUMENTS 5,638,741 A * 6/1997 Cisaria ............................ 99/295
6,199,846 B1 * 3/2001 Crorey ............................ 269/32

(Continued)

FOREIGN PATENT DOCUMENTS

EP 1327407 7/2003
EP 1859713 11/2007

(Continued)

OTHER PUBLICATIONS

International Search Report for Application No. PCT/EP2008/067507 dated Apr. 27, 2010, 2 pages.

*Primary Examiner* — Brian Jennison
(74) *Attorney, Agent, or Firm* — K&L Gates LLP

(57) ABSTRACT

The present invention proposes a device (50) for preparing a beverage from a food substance contained in a capsule (24) by injection of a liquid into the capsule (24) provided to the device (50). Said liquid is provided by a pump of the device, said device comprising an extraction head (20) having an aperture (2.2) for inserting a capsule (24) into a brewing chamber (25) of the device. The brewing chamber (25) is defined by an upper and a lower enclosing member (10a, 10b), a closing mechanism (1) to selectively enclose said capsule by a relative displacement of said enclosing members. The enclosing members are designed for being transferred between an open insertion position for inserting a capsule (24) into the brewing chamber (25) and a closed injection position for enclosing the capsule within the brewing chamber (25), and adjustment means (3a, 3b, 9b, 9c, 7a, 7b, 8a) connected to at least one of said enclosing members (10a, 10b) in order to adjust the relative position of the enclosing members and hence the closing force of the closing mechanism (1).

22 Claims, 5 Drawing Sheets

(56) References Cited

U.S. PATENT DOCUMENTS

| | | |
|---|---|---|
| 6,698,332 B2 | 3/2004 | Kollep et al. |
| 7,059,239 B2 | 6/2006 | Balkau |
| 7,694,624 B2 | 4/2010 | Chen et al. |
| 7,946,219 B2 | 5/2011 | Marconi |
| 2004/0231521 A1 | 11/2004 | Yoakim |
| 2005/0172498 A1* | 8/2005 | Castelmani ............ 30/216 |

FOREIGN PATENT DOCUMENTS

| | | |
|---|---|---|
| JP | 2001202564 | 7/2001 |
| JP | 2003508102 | 3/2003 |
| JP | 2005512750 | 5/2005 |
| JP | 2005211659 | 8/2005 |
| JP | 2007516053 | 6/2007 |
| JP | 2007533382 | 11/2007 |
| WO | 0115581 | 3/2001 |
| WO | 03059778 | 7/2003 |
| WO | 2005063092 | 7/2005 |
| WO | 2005102126 | 11/2005 |

\* cited by examiner

DEVICE FOR PREPARING A BEVERAGE COMPRISING AN ADJUSTABLE CLOSING MECHANISM

BACKGROUND OF THE INVENTION

The present invention relates to a device for preparing a beverage from a food ingredient provided to the device within a capsule. More particularly, the invention relates to such a device comprising an improved closing mechanism for enclosing the capsule, said closing mechanism comprising means for adjusting its closing force.

Devices for preparing a beverage by injecting pressurized fluid to a capsule are well-known, especially in the field of producing coffee or coffee type beverages. In addition, other substances such as chocolate or milk products can be extracted or dissolved to form a beverage. The advantages of such a system are in particular the conservation and freshness of the ingredients, as well as the possibility of facilitating the operations when preparing the beverage.

The method of preparing the beverages using such a device is in principle as follows. The sealed capsule is usually first inserted into a brewing chamber of the beverage preparation device. After that, a water injecting means, such as a needle connected to the liquid supply of the device and which projects inside the brewing chamber, is introduced through or pierces a face of a capsule to inject a hot or cold liquid, in order to make the liquid interact with the ingredients within the capsule. The liquid beverage resulting from this interaction is then discharged through a delivery face of the capsule. For example, the delivery face opens due to the internal pressure in the capsule generated by injecting the liquid.

It should be understood that the interaction between the liquid and the ingredients within the capsule can be e.g. dissolving, extraction, brewing or any other interaction in order to prepare a beverage by means of ingredients provided within the capsule.

In general, the devices for applying said principle of beverage production are equipped with a closing mechanism in order to enable an enclosure of the capsule within the brewing chamber of the device. Such a closing mechanism usually comprises at least two enclosing members which can be moved relatively to each other and wherein the enclosing members may assume an open insertion position for inserting a capsule into the brewing chamber of the device and a closed injection position for enclosing the capsule within the brewing chamber of the device. In such an embodiment it is desirable to provide a mechanism to adjust the relative position of the two enclosing members in order to influence the closing force acting between the enclosing members when the closing mechanism assumes closed position. This is of particular interest as the closing force may vary during operation and usage of the beverage preparation device. In addition, as the enclosing members are generally made of plastic material, formation or distortion of the enclosing members or the closing mechanism may occur during a long lifecycle of the device such that the closing force of the closing mechanism decreases. Hence, for maintenance purposes as well as for enabling a proper functioning of the closing mechanism during a long lifecycle of the beverage preparation device, a method for adjusting the closing force of a closing mechanism of such a device is sought-after.

Moreover, the component parts of such a device are generally manufactured and assembled automatically in different factories. Hence, during production process a deviation regarding the measures of said component parts may occur which leads to a discrepancy of the closing force when the component parts of the closing mechanism is assembled. Reasons for said deviation of measures could be for example material properties due to different charges or the like. Accordingly, a method or means for adjusting the closing force of the closing mechanism is desirable which enables an adjustment of the closing force in a final step of assembly during production of the device, in particular, to correct the possible deviations of the values of closing force.

The present invention seeks to address the above-described problem, i.e. the varying closure force.

OBJECT AND SUMMARY OF THE INVENTION

The invention proposes a device for preparing beverages from a food substance contained in a capsule by feeding (example: injection) of a liquid into the capsule provided to the device, wherein said liquid is provided e.g. by a pump of the device connected to an integrated or external water supply. Said device comprises an extraction head having an aperture for inserting a capsule into a brewing chamber of the device. The brewing chamber is defined by an upper and a lower enclosing member, a closing mechanism to selectively enclose said capsule by relative displacement of said enclosing members. The enclosing members are designed for being transferred between an open insertion position for inserting a capsule into the brewing chamber and a closed position for enclosing the capsule within the brewing chamber, and adjustment means connected to at least one of said enclosing members in order to adjust the relative position of the enclosing members and hence the enclosing force of the closing mechanism.

In possible modes of the invention, the adjustment means may comprise eccentric means or cam means enabling to vary the closing force of the closing mechanism. The eccentric means or cam means may be part of the closing mechanism and may vary the closing force by adjusting their relative rotational positions.

With a device according to the present invention, it is possible to enable an interaction between liquid supplied by the device and ingredients contained in a capsule provided to the device through an aperture at the extraction head. In a preferred mode, the internal pressure within the sealed capsule which is built up due to the liquid supplied to the capsule causes a lower face of the capsule to open and thus enables the output of the beverage to be prepared. Thereby, the injection of the liquid provided by the device takes place at an upper face of the capsule which can be pierced by an injection member of the device situated preferably at the upper enclosing member. In a possible alternative, the capsule may already have an inlet port and the injection of liquid can be done by connecting an injection member such as a tube to an inlet port of the capsule. As already described, the output of the beverage to be prepared takes place at a lower face of the capsule thus, enabling a direct flow of the liquid. Accordingly, a receptacle such as a cup can be placed beneath the capsule in order to receive the beverage to be prepared.

WO 03/059778 relates to such a capsule which is preferably used for beverage preparation with the present device. The capsule is preferably a sealed capsule having a body of inox material such as aluminium and contains one or more ingredients. After the injection of liquid into the capsule, the pouring from the capsule may be delayed in order to provide sufficient time for the interaction of the liquid and the ingredients contained within the capsule. For the pouring of the beverage to be prepared from the capsule, opening means such as relieves against an outlet membrane which open a lower wall of the capsule may be provided. These opening means interact with the pressure rise within the capsule when the liquid is injected. The capsule has among others the advantage that beverages can be prepared without a "cross contamination" i.e. that a first beverage to be prepared does not transmit one or more undesired characteristics such as taste, colour and/or odour to a second beverage distributed after the first.

The closing mechanism of the device can be used to selectively enclose the capsule within the brewing chamber of the device, by means of a relative displacement of an upper and a lower enclosing member defining the brewing chamber of the device. The closing mechanism can assume an open insertion position for inserting a capsule into the brewing chamber and a closed injection position for enclosing the capsule within the brewing chamber. Furthermore, the enclosing members of the closing mechanism are designed for being transferred between said open insertion position and said closed injection position. Accordingly, by usage of the closing mechanism, the capsule provided to the brewing chamber of the device can effectively be enclosed between said enclosing members and thereby be effectively pierced by the injection member of the device connected to one of the enclosing members. Preferably such an injection element is a needle designed to pierce an upper face of the capsule which is therefore connected to the upper one of said enclosing member.

When the closing mechanism is in the open insertion position, the enclosing members are spaced apart from each other in order to enable an insertion of the capsule into the brewing chamber. To enclose the capsule within the brewing chamber, the closing mechanism may be operated thus enabling a relative movement of the two enclosing members. During said operation of the closing mechanism in order to enclose the capsule, the enclosing members are approached with respect to each other. Preferably, one of the enclosing members is fixed at the extraction head of the machine, whereas the other enclosing member is connected to the closing mechanism. More preferably, the upper enclosing member is connected to the closing mechanism.

As adjustment means are connected to at least a first one of said enclosing members, the relative position of said first enclosing member with respect to the second enclosing member can be adjusted at least as regards the closed position. Hence, when the closing mechanism is in an open position which relates to a position in which the two enclosing members are spaced apart from each other compared to the closed position, the position of one of the enclosing members can be modified in order to approach or separate the two enclosing member. Thus, the relative position of the enclosing members can be adjusted without operating the closing mechanism. Accordingly, the relative position of the enclosing members when the closing mechanism is brought into its closed position is modified. This results in an adjustment of the closing force of the enclosing members which can therefore be manually adjusted during production and/or by a consumer.

Preferably, the closing mechanism is a knee lever closing mechanism comprising an upper and a lower rod connected by an axle. It is thus possible to provide a space saving closing mechanism which is connected at least to a first one of the enclosing members. The second enclosing member is preferably provided at a fixed position inside the extraction head of the device. Hence, a relative movement of the upper and the lower enclosing member is enabled. Furthermore, the transmission of force may easily be adjusted by providing an upper and a lower rod of different lengths. Thus, the operating force of the closing mechanism can easily be regulated and adapted to the needs of a user of the device.

Preferably, the axle connecting the upper and the lower rod of the knee lever closing mechanism is eccentric. Therefore, by turning the eccentric axle, the arrangement and in particular the distance between the upper and the lower rod of the knee lever closing mechanism can be modified.

Furthermore, by adjusting the relative position of the two enclosing members, the biasing force of the knee lever closing mechanism when being in its closed position can be regulated by the adjustment means. This is especially advantageous since the biasing force of the closing mechanism when being in its closed position can be adapted to the needs of a user of the device.

In a preferred embodiment the adjustment means comprise at least one geared disc member which is preferably connected to the axle of the knee lever closing mechanism. Preferably, the disc member and the axle of the knee lever closing mechanism are arranged coaxially. Such a disc member may be gear wheel, a spur-gear or any other disc member being equipped with circumferential teeth or the like. Accordingly, a rotation of the disc member enables a rotation of the axle of the knee and hence an alteration of the distance between the centre of the axle and the point of suspension of the upper enclosing member which is connected to the lower rod of the knee lever closing mechanism. The distance can be adjusted by less than 3 mm. Preferably, the distance can be adjusted by less than 1 mm, most preferably less than 0.5 mm.

Furthermore, the disc member may as well be engaged by holding means which interlock with the geared disc member in order to prevent unintended rotation of the axle. Therefore, a predefined setup or adjustment of the disc member in order to regulate the closing force of the closing mechanism can be effectively maintained.

The disc member is further designed such that the eccentric axle of the knee lever closing mechanism can only be rotated to a certain extent. Therefore, a user operating the adjustment means is prevented from rotating the axle to such an extent that the expected alteration of the distance between the two rods of the knee lever closing mechanism and hence the adjustment of the closing force of the closing mechanism is not corresponding with the actual alteration obtained by the rotation. Accordingly, the adjustment means comprise stopping means which enable a rotation of the eccentric axis only to a certain extent either in clockwise or counter clockwise direction.

In a preferred embodiment, the disc member is provided with connection means in order to connect a tool. Hence, a tool may be provided which can be inserted into the aperture. In addition, the tool may provide means for the disengagement of the holding means in order to release the connection between the disc member and the holding means and thus enabling a rotation of the disc member as well as the axle of the knee lever closing mechanism. Preferably, the connection means is an aperture provided in the centre of the disc member which has a predefined design. More preferably, the aperture is designed as being a semicircle aperture. Accordingly, in a final assembly process of the device, the closing force of the closing mechanism can be adjusted by using such a tool. Moreover, the closing force may be adjusted for maintenance purposes of the device.

In a second embodiment of the present invention, the adjustment means are connected to the axis of suspension of the upper rod of the knee lever closing mechanism. Preferably, the adjustment means according to this embodiment comprise at least one rotatable disc member mounted at a support by means of a cam protruding in radial direction of said disc member. More preferably, a plurality of protruding cams is distributed over the circumference of the disc member such that they can selectively be mounted at a support in order to adjust the position of the axis of suspension of the knee lever closing mechanism. Hence, the position of the axis of suspension of the closing mechanism within the extraction head can be adjusted vertically or preferably horizontally in order to regulate the axis of suspension of the upper rod of the knee lever closing mechanism. Accordingly, the closing force can be regulated as desired, as the relative position of the two enclosing members in an open or closed state of the closing mechanism can be altered. It should be understood that the circumferential cams of the disc member protrude to a different extent in radial direction. Hence, by selectively mounting one of the different cams of different lengths at the support, the suspension point of the axis connected to the upper rod of the knee lever closing mechanism can be adjusted.

Moreover, the adjustment means of this second embodiment further comprises a shaft member connected between the disc member and the knee lever closing mechanism. This shaft member preferably acts as an additional support for the adjustment means. The shaft member is further equipped with at least one circular recess concentric to the axis of the shaft member and extending in its longitudinal direction. Said circular recess abuts on a circular support member of the extraction head. In a preferred embodiment, a plurality of graded circular recesses is distributed over the circumference of the shaft member and can be selectively brought to abut on the support member. Hence, by rotating the shaft member, the circular recesses can be made to abut on the support member. Since the concentric circular recesses are of different heights with respect to the axis of the shaft member, the shaft member can be used as additional support for the adjustment means. Accordingly, as the circular recesses are arranged in such a way that when the disc member having a plurality of protruding cams is rotated in order to adjust the position and preferably the height of the axis of suspension of the knee lever closing mechanism, a circular recess of corresponding height abuts on the given support member of the extraction head, hence enabling a support of the axis of suspension in order to enhance the bearing of the knee lever closing mechanism. Thus, the knee lever closing mechanism can be operated in a stable manner.

In an alternative embodiment, the protruding cams which can selectively be mounted at the support are protruding from the disc member to the same extent in radial direction, i.e. they are of the same lengths. In this embodiment, the support is spring mounted at the casing of the device and hence exerts a force onto the cam of the disc member mounted at the support due to the biasing force of the spring. Thereby, the disc member is pressed in such a direction to cause the shaft member of the axle of suspension of the upper rod of the knee lever closing mechanism to be pressed against the circular support of the extraction head. Thus, the circular recesses provided at the shaft member can be mounted selectively at the circular support by turning the disc member. Thereby, the position of the axle of suspension of the upper rod of the knee lever closing mechanism can be altered. Hence, the relative position of the upper and lower closing member can be altered in order to adjust the closing force of the closing mechanism.

It should be understood that the device is preferably operated with a capsule containing ground coffee, chocolate, milk, tea or another substrate which can be made to interact with liquid injected into the capsule in order to prepare a beverage. Moreover, the capsule is preferably a sealed capsule which is opened after the capsule is inserted into the device.

BRIEF DESCRIPTION OF THE DRAWINGS

Further features, advantages and objects of the present invention would come apparent for the skilled person when reading the following detailed description of embodiments of the present invention, when taking in conjunction with the figures of the enclosed drawings

FIG. 1 shows a beverage preparation device 50 according to the present invention in side view. The device 50 comprises a housing 50a containing at least a boiler 60, a pump 70 and control means 80. Further the device comprises a reservoir 40 connected to the device, an extraction head 20 and a base 50f which is preferably provided with feet for standing the device thereon in a stable manner. The device further comprises a stand 50d for a receptacle such as a cup having an upper surface 50e provided with a grid 50g on which the receptacle is positioned.

Figure 1:
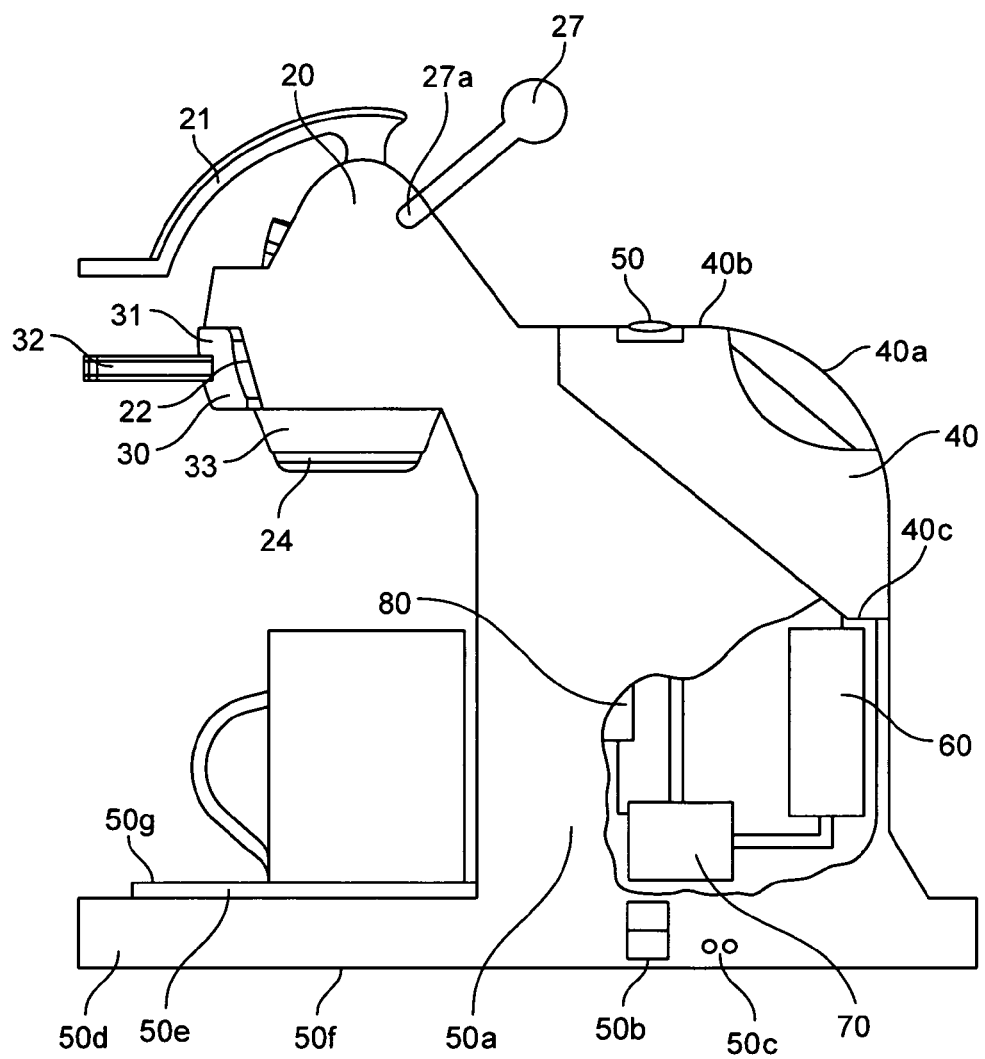
FIG. 1 shows a device for beverage preparation according to the present invention in side view.

The reservoir 40 is provided in order to supply liquid such as water to the boiler 60 and the pump 70, and hence to the extraction head 20 of the device 50. Inside the extraction head 20, an injection element 11 (not shown in FIG. 1) is provided which is connected to the pump 70. Hence, when liquid is provided to said injection element 11, a capsule 24 pierced by the injection element 11 can be effectively provided with liquid and a beverage can be prepared from the ingredients within the capsule 24. Preferably, the reservoir 40 is connected to the device in a detachable manner and has an inlet 40b in order to insert liquid. It is preferably provided with a handhold 40a for facilitating the handling of the reservoir 40. Thus a user can handle the reservoir 40 in a convenient way. An outlet 40c which is preferably situated at the bottom of the reservoir 40 enables a connection between the reservoir 40 and the device 50.

The extraction head 20 of the device comprises a handle bar 21 connected to a closing mechanism 1 (not shown in FIG. 1) for selectively enclosing a capsule 24 provided to the device 50 and a control lever 27 for selectively supply either cold or hot water to the extraction head 20 and hence to the capsule 24. The handle bar 21 as shown in FIG. 1 is in a closed position, thereby enclosing the capsule 24. The control lever 27 is connected at least to the control means 80 of the device 50. Hence, the control lever 27 may be switched over from a neutral position to a first position choosing hot water or to a second position choosing cold water by moving the control lever 27 to the left or to the right when seen in front-rear direction of the device 50. Accordingly, a user can choose whether to provide cold or hot water to the capsule 24 provided to the device in order to prepare a cold or hot beverage. For enabling the movement of the control lever 27 the housing 50a of the device 50 provides a groove 27a at the extraction head 20.

As can be seen in FIG. 1, a capsule-holder 30 may be inserted into the aperture 22 of the extraction head 20 in order to provide a capsule 24 housed by means 33 for receiving the capsule 24 to a brewing chamber 25 (not shown in FIG. 1) of the extraction head 20. A handhold 32 is connected to the capsule-holder 30 in order to enable a convenient handling of the capsule-holder 30. Furthermore, the capsule-holder 30 is furnished with a front cover 31, which covers the aperture 22 when the capsule-holder is inserted into said aperture 22.

The device further comprises a main switch 50b and a plurality of control indicators 50c which may inform the user about the operating status of the device 50.

Figure 2:
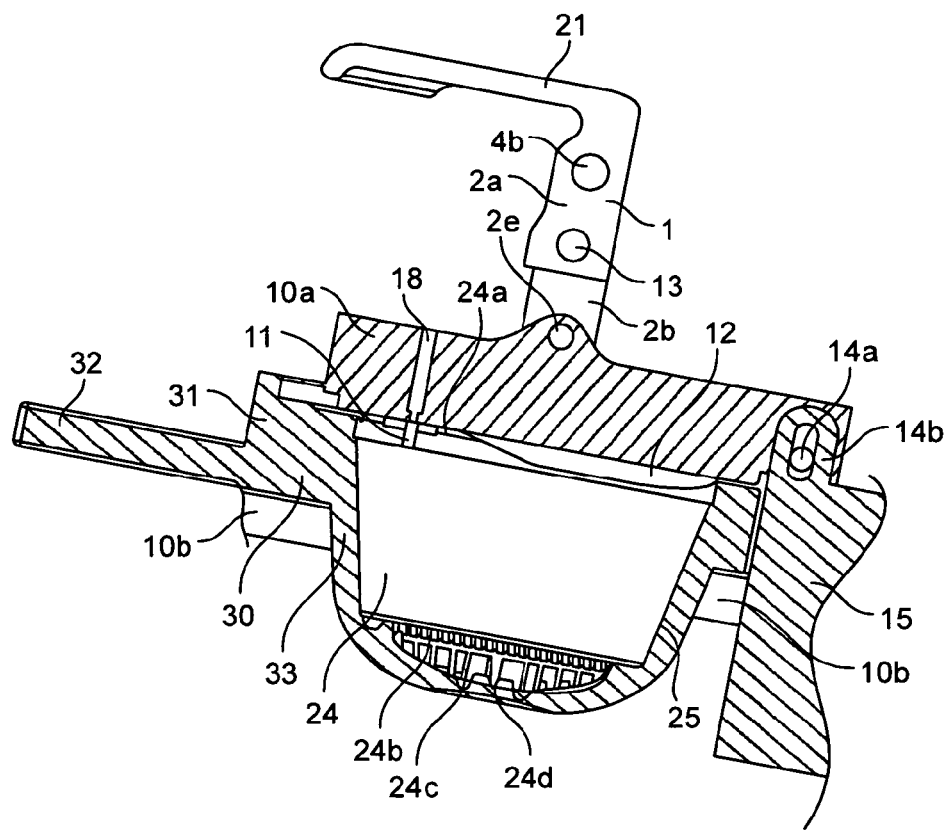
FIG. 2 shows a capsule provided to the aperture of the extraction head of the device in side view.

FIG. 2 shows a preferred embodiment of the inside of the extraction head 20 of the device 50 in cross sectional side view. In this preferred embodiment, the capsule 24 is provided to the device 50 by means of a capsule-holder 30 which is inserted into the aperture 22 (see FIG. 1) of the extraction head 20 (see FIG. 1). Two enclosing members 10a, 10b are provided in order to enclose the capsule 24 within a brewing chamber 25 of the extraction head 20. The capsule 24 is thus enclosed by a first enclosing member 10a and a second enclosing member 10b. In this preferred embodiment, said second enclosing member 10b are guiding means provided within the aperture 22 of the extraction head 20 in order to keep a capsule-holder inserted into the aperture 22 at a fixed position within the extraction head 20. In another preferred embodiment, wherein the capsule 24 is inserted into the aperture 22 and thus provided to the brewing chamber 25 by hand, the second enclosing member 10b may be designed as guiding means for directly receiving the capsule 24 provided by a user. Thus, in another preferred embodiment, a capsule 24 may as well be effectively enclosed without a capsule-holder 30 inserted into the aperture 22.

The first enclosing member 10a is connected to the closing mechanism 1 in order to enable a relative movement of the two enclosing members 10a, 10b. Thus, the second enclosing member 10b is situated at a fixed position within the aperture 22 of the extraction head 20, whereas the first enclosing member 10a can be moved relatively to the second enclosing member 10b. Preferably, the first enclosing member 10a can be lowered or lifted in order to approach or separate the two enclosing members 10a, 10b. Accordingly, the enclosing members 10a, 10b are designed for being transferred between an open insertion position in which a capsule 24 or a capsule-holder 30 housing said capsule 24 may be inserted into the brewing chamber 25 of the device and a closed injection position in which the capsule 24 is enclosed and pierced by the needle element 11 provided at one of the enclosing member 10a, 10b. Thereby, the brewing chamber is defined by the first enclosing member 10a which is the upper enclosing member and the second enclosing member 10b which is the lower enclosing member.

As shown in FIG. 2, the closing mechanism 1 is in a closed state in which the upper enclosing member 10a connected to the closing mechanism 1 is in its lower injection position. Hence, the needle element 11 provided at the enclosing member 10a is enabled to pierce the capsule 24 which is housed by the housing means 33 of the capsule-holder 30.

In order to enable a relative movement of the enclosing member 10a, 10b, the closing mechanism 1 connected to the enclosing member 10a comprises pivoting means 4b, 13, 2e, 14a and a handle bar 21 to operate the closing mechanism 1. Thereby, the pivoting means 14a are preferably situated close to the back wall 15 of the brewing chamber 25 and connected to a bearing 14b provided at the back wall 15. The closing mechanism 1 as shown in FIG. 2 is preferably a knee lever closing mechanism. Of course, any other closing or transmission mechanism may be connected at least one of the enclosing members 10a, 10b in order to enable a relative movement of the two enclosing members 10a, 10b.

The upper enclosing member 10a is connected to the closing mechanism 1 by means of a pivot 2e connected to a lower rod 2b of the closing mechanism 1. Moreover, the upper enclosing member 10a is provided with a protruding convex part 12 which is situated at the same face of the enclosing member 10a as the needle element 11. Thus, the convex part 12 of the enclosing member 10a protrudes into the brewing chamber 25 to reduce the internal volume of the capsule placed beneath the support, in order to reduce the "whale effect" as described in co-pending European patent application No. 07103613.1 filed on 6 Mar. 2007.

As the pump 70 of the device 50 provides liquid a supply connected to the needle element 11 and thus to the capsule 24 beneath the injection member 10, the liquid is made to interact with the ingredients provided within the capsule 24. In addition, pressure is built up within the capsule 24 due to the liquid introduced by the needle element 11. Accordingly, an outlet membrane 24b is pressed against reliefs 24c provided beneath the outlet membrane 24b. Hence, the outlet membrane 24b is opened and the beverage is poured from the capsule 24 downwardly via an outlet 24d. Thus, a direct flow principle of the liquid provided by the device 50 is adapted. The present invention may as well apply to any other food or beverage cartridge, pod or sachet containing ingredient(s) brewed, dissolved or diluted in a beverage device according to other principles than the one described in WO 03059778. In the context of the invention, the term "capsule" is used to encompass such cartridge, pod or sachet using these other brewing principles.

Figure 3:
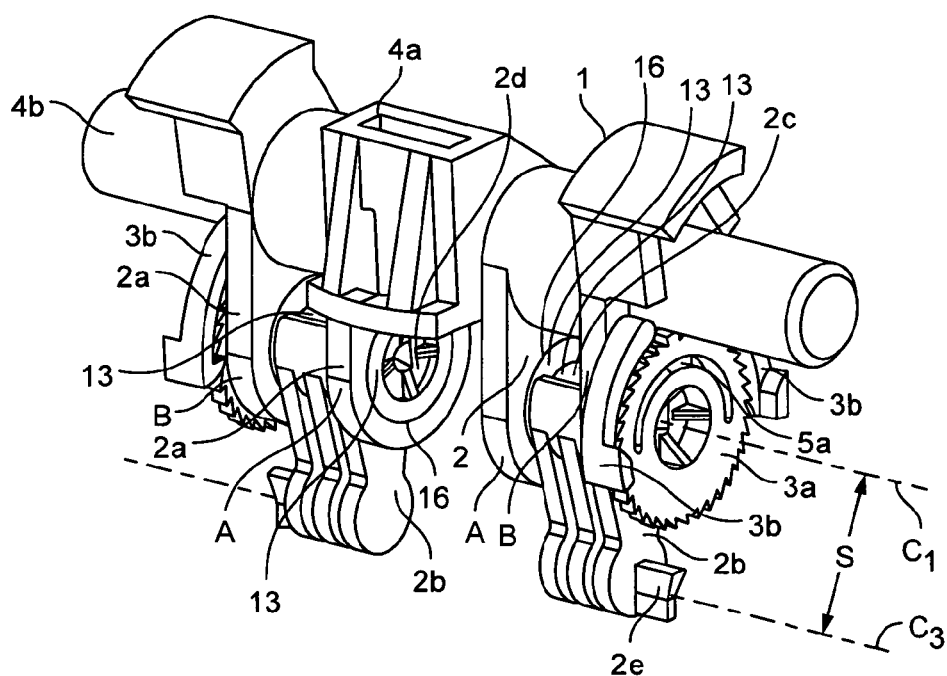
FIG. 3 shows a preferred embodiment of the knee-lever closing mechanism being equipped with play compensation means in perspective side view.

FIG. 3 shows a preferred embodiment of the closing mechanism 1 in perspective side view. The closing mechanism 1 is preferably a knee lever closing mechanism comprising an upper rod 2a and a lower rod 2b. Said two rods 2a, 2b are connected by an axle 13. The closing mechanism 1 further comprises an axle of suspension 4b for mounting the closing mechanism 1 at a given support inside the extraction head 20. Connection means 4a are designed as an integral part of the axle of suspension 4b. Thus, an operating element such as a lever 21 (not shown in FIG. 3) can be connected to the connection means 4a in order to enable a user to operate the closing mechanism 1. Preferably, the connection means 4a is designed as a rectangular aperture which enables an insertion of an operating element 21 in order to rotate the axle of suspension 4b and hence enable an operation of the closing mechanism 1.

The upper rod 2a of the knee lever closing mechanism 1 is preferably an integral part of the axle of suspension 4b. The upper rod 2a comprises means 16 such as circular apertures for housing the axle 13 connecting the upper rod 2a and the lower rod 2b.

The lower rod 2b are preferably provided with connections means 2e such as pivoting means for establishing a connection between the lower rod 2b and the upper enclosing member 10a (not shown in FIG. 3). Hence, a closing force applied during operation of the closing mechanism 1 can effectively be transmitted by means of the connections means 2e from the lower rod 2b to the upper enclosing member 10a.

In a preferred embodiment according to FIG. 3, the upper rod 2a of the knee lever closing mechanism 1 is formed by two equal rod members A, B protruding from the axle of suspension 4b. The axle 13 can thus be mounted by concentric apertures 16 provided to the two rod members A, B. Said two rod members A,B are preferably spaced apart from each other at a certain distance z1 (see FIG. 6). Since the axle 13 is housed by the two rod members A,B, and therefore is connecting the two rod members A,B, the lower rod 2b of the knee lever closing mechanism 1 can be connected to the axle 13 between the two rod members A,B. Preferably, the closing mechanism 1 comprises two upper rods 2a and two lower rods 2b each of them connected by an axle 13 as shown in FIG. 3. Thereby, the two upper rods 2a are provided to the axle of suspension 4b of the knee lever closing mechanism 1 and are protruding in the same direction. More preferably, the two upper rods 2a are located symmetrically on two opposing sides with respect to the centre of the axle of suspension 4b. Hence, the closing mechanism 1 can be operated in a stable manner. Furthermore, an equal transmission of closing force from the closing mechanism 1 onto the upper enclosing element 10a connected to the lower rods 2b is enhanced.

It should be understood, that the length of the upper and lower rods 2a,2b may be varied in order to modify the transmission of the closing mechanism 1 and hence the force to be applied by a user in order to operate the closing mechanism 1.

As shown in FIG. 3, the axis c1 corresponds to the axis of suspension of the axle 13. The axis c3 corresponds to the axis of suspension of a pivoting means 2e for connecting the lower rod 2b and the upper enclosing member 10a (not shown). The distance s between the axis c1 and the axis c3 is adjustable in order to adjust the closing force of the closing mechanism 1 as will be described in the following.

Figure 4:
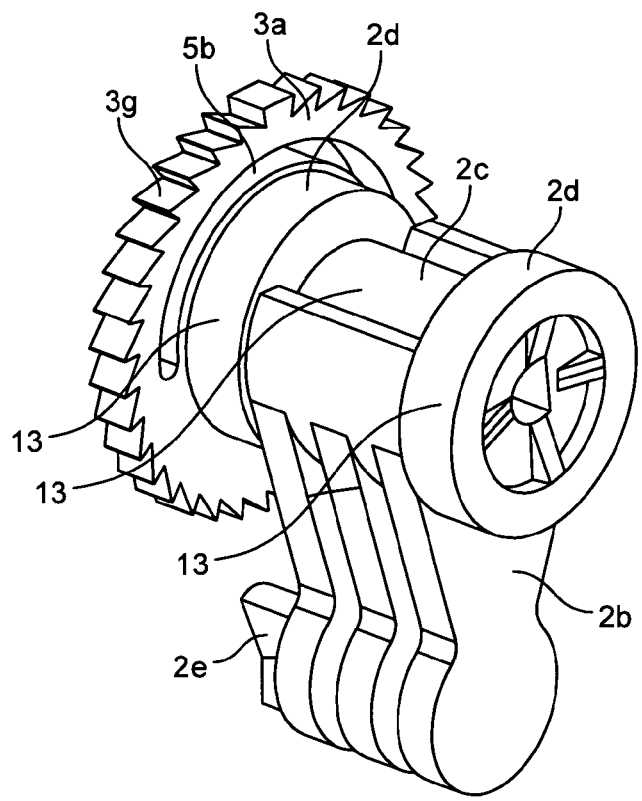
FIG. 4 shows the disc member connected to the axle of the knee lever closing mechanism mounted at the lower rod of the knee lever closing mechanism in perspective side view.

As shown in FIG. 4, the axle 13 is eccentric and comprises two outer disc members 2d connected by means of an axle 2c. Said two outer disc members 2d which are concentric and of the same diameter may be housed by the apertures 16 provided at the rod members A,B of the upper rods 2a. The axle 2c is eccentric with regard to the outer disc members 2d and mounted at the lower rod 2b. Thus, by rotation of the eccentric axle 13, a rotational motion is translated into a stroke movement by means of the axle 2c being connected to the lower rod 2a. Accordingly, by rotation of the axle 13, a stroke movement of the enclosing member 10a is enabled, since the lower rod 2a is connected to the upper enclosing member 10a. Hence, the distance s between the axis c1 of the outer disc members 2d of the axle 13 and the axis of suspension c3 of the upper enclosing member 10a is altered. Therefore, by rotating the axle 13, the enclosing member 10a can either be lifted or lowered depending on the rotational direction of the axle 13.

Figure 5:
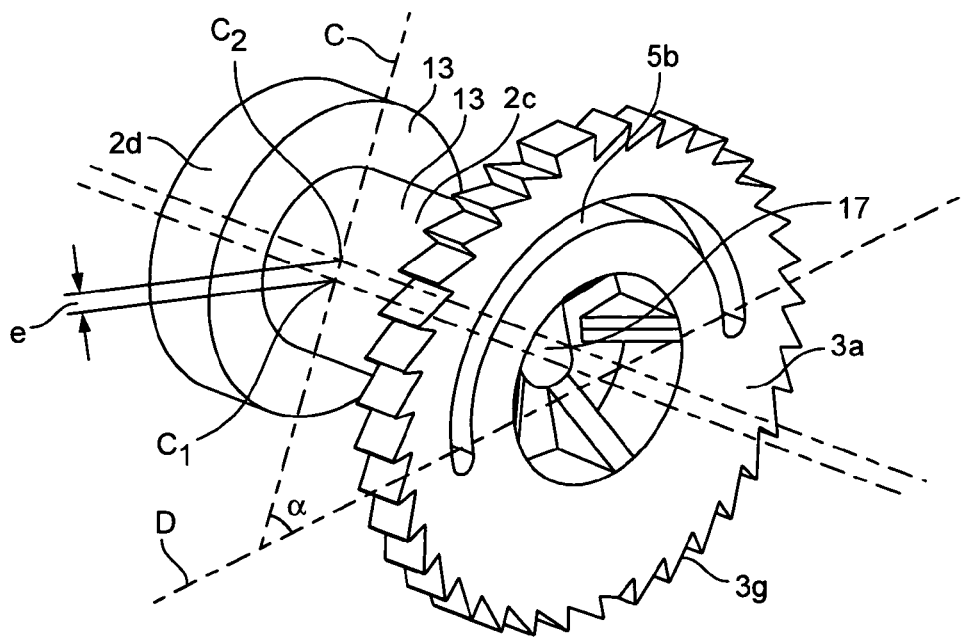
FIG. 5 shows a preferred embodiment of the disc member connected to the axle of the knee lever closing mechanism in perspective side view.

As can be seen in FIG. 5, the centre axis c1 of the disc members 2d and the centre axis c2 of the axle 2c are spaced apart according to a distance e. Hence, by rotating the axle 13, a maximum stroke of the lower rod 2b corresponding to the distance e can be obtained. Preferably, the distance e is less than 0.5 mm. Accordingly, by rotating the axle 13, the distance s between the axis c1 of the axle 13 and the axis c3 of the lower rod 2b can be altered by a value which is maximum twice the value of said distance e. Therefore, the two enclosing members 10a,b can either be approached or separated by a value which is maximum twice the value of the distance e of the eccentric axle 13, without the closing mechanism 1 being operated. The closing force of the closing mechanism 1 can therefore effectively be adjusted.

As shown in FIGS. 3,4 and 5, adjustment means 3a,3b are connected to the knee lever closing mechanism 1. Said adjustment means preferably comprise a disc member 3a connected to the axle 13. Preferably the disc member 3a is a geared disc member which is equipped with circumferential teeth 3g. Moreover, the adjustment means comprise holding means 3b which are preferably designed as an integral parts of the upper rods 2a of the knee lever closing mechanism 1. Said holding means have preferably a bracket-like design protruding from the upper rods 2a. Further, the holding means 3b comprise engagement means 3c (see FIG. 6) which enable an engagement of the circumferential teeth 3g of the disc member 3a. Thus, interlocking between the holding means 3b and the disc member 3a is enabled. Accordingly, a rotation of the disc member 3a and hence of the axle 13 during operation of the closing mechanism 1 is prevented. Thus, a predefined setup of the adjustment means may be maintained.

Furthermore, the holding means 3b are equipped with detaching means 3d in order to loosen the engagement of the holding means 3b and the disc member 3a. Preferably, said detaching means 3d are slanted edge members situated in vicinity of the engagement means 3c. Hence, in order to enable a rotation of the axle 13, a tool such as a yoke or the like may be used which loosens the connection between the holding means 3b and the disc member 3a by spreading the bracket-like holding means 3b.

The disc member 3a further comprises connection means 17 for connecting a tool in order to rotate the disc member 3a. Preferably, the connection means 17 is a circular recess situated at the centre of the disc member 3a. More preferably, the recess 17 is a semi-circular aperture which enables an insertion of a tool in order to rotate the disc member 3a and the axle 13. Hence, a tool which loosens the connection between the holding means 3b and the disc member 3a and thereby enables a rotation of the disc member 3a may be connected to the recess 17 in order to adjust the closing force of the closing mechanism 1. Via this tool which acts on the holding means 3b and the connection means 17, the upper enclosing member 10a can be lowered or lifted within the extraction head 20 due to a rotation of the axis 13. When during this adjustment the enclosing member 10a is lowered, the closing force will be increased. Then the enclosing member 10a is lifted, the closing force will be decreased. Such a tool may be provided to adjust the closing force in a final step of assembly during the manufacturing process of the device 50. Moreover, such a tool may be provided in order to adjust the closing force for maintenance purposes.

Moreover, a protruding nose 5a is provided at the upper rod 2a of the knee lever closing mechanism 1. Said nose 5a is preferably an integral part of the upper rod 2a and is engaged by a circular groove 5b provided at the disc member 3a. The groove 5b is preferably a semi-circular groove. Thus, the maximum rotation which can be performed by the disc member 3a and hence by the axle 13 connected to the disc member 3a is 180°.

As shown in FIG. 5, the semi-circular groove 5b is disposed on one side of a centre axis D which connects the two endings of the semi-circular groove 5b. In a preferred embodiment, the semi-circular groove 5b is located such that the axis D is at a predefined angle $\alpha$ to an axis C perpendicular to the centre axes c1 and c2 of the disc member 2d and the eccentric axle 2c. The angle $\alpha$ between the axis C and the axis D is preferably 45°. Accordingly, the stroke of the lower rod 2b mounted at the eccentric axle 2c may be adjusted by rotating the disc member 3a. Hence, the rotation of the disc member 3a enables an adjustment of a distance s between the centre c1 of the axle 13 and the axle of suspension c3 of the upper enclosing member 10a of the knee lever closing mechanism 1. Therefore, the upper enclosing member 10a is either lifted or lowered with respect to the lower enclosing member 10b, when adjusting said distance.

At a neutral position of the disc member 3a, the nose 5a engaged by the circular groove 5b is disposed at equal distance to each of the endings of the circular groove 5b. Thus, the disc member 3a may be rotated either 90° in a clockwise or in a counter clockwise direction. Accordingly, the axle 13 is rotated by 90° in a clockwise or in a counter clockwise direction. Thus, the stroke translated by the eccentric axle 2c may be adjusted by the rotation of the disc member 3a which enables an adjustment of the closing force of the closing mechanism 1. Thereby, the predefined angle α of preferably 45° between the axis C and the axis D enables a weakening or a strengthening of the closing force of the closing mechanism 1 to nearly an equal extent in either case due to the change of stroke of the lower rod 2b caused by rotation of the axle 13.

Figure 6:
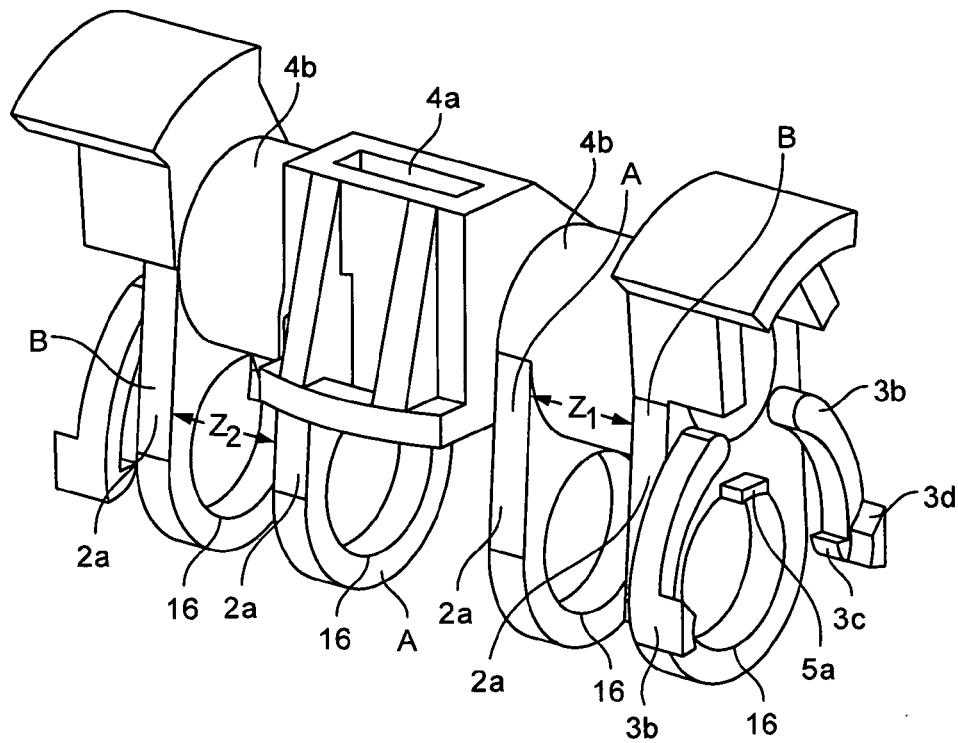
FIG. 6 shows the upper rod of the knee lever closing mechanism being connected to the axle of rotation of the closing mechanism in perspective side view.

FIG. 6 shows a perspective side view of the upper rods 2a of the knee lever closing mechanism which is an integral part of the axis of suspension 4b of the knee lever closing mechanism 1. As can be seen from FIG. 6, the upper rods 2a comprise concentric circular apertures 16 of preferably of the same diameter, in which the disc members 2d of the axle 13 connecting the upper rods 2a and the lower rods 2b of the knee lever closing mechanism 1 are mounted. As already described, each of the upper rods 2a is preferably formed by two rod members A, B. The two rod members A,B are spaced at a distance z1 from each other. Hence, the lower rod 2b can effectively be connected to the axle 13 between the two rod members A,B.

Figure 7:
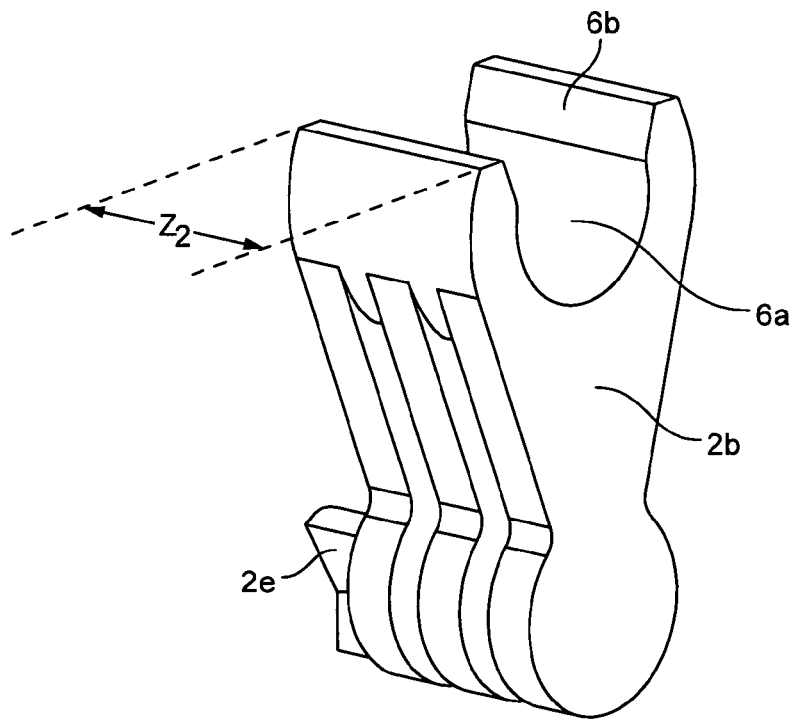
FIG. 7 shows a preferred embodiment of the lower rod of the knee lever closing mechanism in perspective side view.

FIG. 7 shows a preferred embodiment of the lower rod 2b comprising a semi-circular bearing 6a for mounting the axle 13 or particularly the eccentric part 2c of the axle 13 which connects the lower rod 2b and the upper rod 2a.

The bearing 6a is preferably an integral part of the lower rod 2b and comprises slanted edges 6b for enhancing the assembly of the lower rod 2b and the axle 13. Since the lower rod 2b is connected to the axle 13 between the two rod members A,B (shown in FIGS. 3 and 6), the width z2 of the lower rod 2b has to be smaller than the distance z1 between the two rod members A,B.

Moreover, the lower rod 2b comprises connecting means 2e such as pivoting means or the like in order to establish a connection with the upper enclosing member 10a. Hence, a closing force applied to the lower rod 2b can effectively be transmitted to the upper enclosing member 10a via the connecting means 2e.

Figure 8:
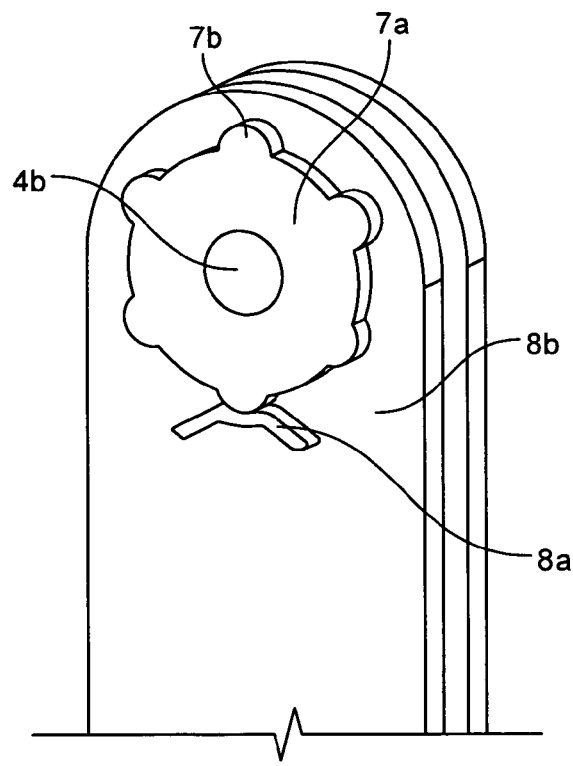
FIG. 8 shows a second preferred embodiment of the play compensation means situated at the axle of suspension of the upper rod of the knee lever closing mechanism in perspective side view.
Figure 9:
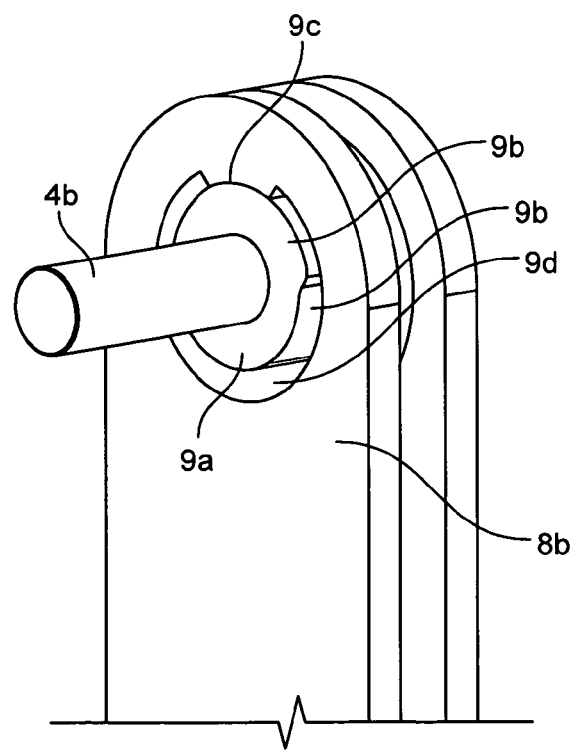
FIG. 9 shows a second preferred embodiment of the play compensation means according to FIG. 8 in a perspective side view relating to an opposite side as shown in FIG. 8.

FIGS. 8 and 9 show an alternative embodiment of the present invention, wherein the adjustment means are connected to the axle of suspension 4b of the upper rod 2a of the knee lever closing mechanism 1. As can be seen from FIG. 8, the adjustment means preferably comprise a rotatable disc member 7a being connected to the axis of suspension 4b of the closing mechanism 1. Thereby, the rotatable disc member 7a is equipped with circumferential cams 7b which are preferably integral parts of the disc member 7a. The cams 7b are mounted at a support 8b of the extraction head 20 by means of a protruding support member 8a. When rotating the disc member 7a, the cams 7b can therefore selectively be mounted at the support member 8a.

The cams 7b provided at the disc member 7a are preferably protruding to a different extent in radial direction of the disc member 7a. Hence, by mounting different cams 7b at the support member 8a, the distance between the support member 8a and the centre of the disc member 7a can be varied. Therefore, the bearing point of the axis of suspension 4b which is within the centre of the disc member 7a can be altered.

In a preferred embodiment, the disc member 7a and the support member 8a are preferably arranged vertically to each other such that a change of distance between the support member 8a and the centre of the disc member 7a results in an alteration of height of the axis of suspension 4b of the upper rod 2a of the knee lever closing mechanism 1. Accordingly, the closing force of the closing mechanism 1 is influenced as the relative position between the two enclosing members 10a,10b is changed by adjusting the height of the axis of suspension 4b of the upper rod 2a of the closing mechanism 1.

Furthermore, as shown in FIG. 9, the axis of suspension 4b of the closing mechanism 1 comprises a shaft member 9a which is connected between the disc member 7a and the knee lever closing mechanism 1. Said shaft member 9a is preferably equipped with a plurality of circular recesses 9b which are concentric to the shaft member 9a. The recesses 9b extend in longitudinal direction of the shaft member 9a and can be selectively brought to abut on a circular support member 9c located within a circular aperture 9d of the support 8b. The recesses 9b are preferably graded which means they are recessed to a different extent in radial direction of the shaft member 9a. The support member 9c is preferably located at a higher vertical position than the axis of suspension 4b.

Furthermore, the graded circular recesses 9b act as a bearing point when abutting on the circular support 8b. Hence, when rotating the disc member 7a in order to change the vertical position of the axis of suspension 4b within the aperture 9d of the support 8b, a corresponding circular recess 9b is brought to abut on the circular support 9c. Thus, the axis of suspension 4b is supported by two bearing points, the support member 8a and the support member 9c. Accordingly, a stable suspension of the closing mechanism 1 is obtained.

Preferably, the axis of suspension 4b is mounted on both sides of the extraction head 20, wherein both sides are equipped with such adjustment means according to FIGS. 8 and 9.

The adjustment means according to any of the shown embodiments are preferably easily accessible from the side of the extraction head 20. Hence, the adjustment of the closing force during the assembly process or for maintenance purposes is enhanced. Moreover, the adjustment means according to the shown embodiments are screwless which enables a facilitated and cost effective manufacture of the closing mechanism.

Although the present invention has been described with reference to preferred embodiments thereof, many modifications and alternations may be made by a person having ordinary skill in the art without departing from the scope of this invention which is defined by the appended claims. For example, any other closing mechanism may be applied in order to connect the operational lever 21 and the upper enclosing member 10a. Moreover, the lower enclosing member 10b can be any member beneath the upper enclosing member 10a which is provided at the extraction head 20 and suitable for enclosing a capsule 24. The design of the enclosing members 10a,10b may as well vary in order to meet different requirements regarding the injection conditions of the beverages to be prepared by piercing the capsule 24. It may as well be possible to provide more than two enclosing members in order to enclose a capsule or the like within a brewing chamber of the device.

The adjustment means may as well be located at a lower rod 2b of a knee lever closing mechanism. Furthermore, the adjustment means may be accessible from outside the extraction head in order to enable an operator of the device 50 to adjust the closing force of the closing mechanism 1.

Relating to the alternative embodiment according to FIGS. 8 and 9, it may as well be possible that semi-circular recesses of different depths are provided over the circumference of the rotatable disc member 7a and a cam member is situated at the support 8b.

The invention claimed is:

1. A device for preparing a beverage from a food substance contained in a capsule by feeding a liquid into the capsule provided to the device, wherein the liquid is fed by an internal or external water supply, the device comprising:
a housing comprising an extraction head having an aperture for inserting a capsule into a brewing chamber of the device, the brewing chamber is defined by an upper enclosing member and a lower enclosing member;
a closing mechanism to selectively enclose the capsule by a relative displacement of the enclosing members, wherein the enclosing members are designed for moving between an open insertion position for inserting a capsule into the brewing chamber and a closed position for tightly enclosing the capsule within the brewing chamber, the closing mechanism comprises a knee lever comprising an upper rod and a lower rod connected to each other by a first axle, the closing mechanism further comprises a second axle extending through the upper rod and mounting the closing mechanism inside the extraction head, and a connection member integral with the second axle connects the closing mechanism to a handle exterior to the housing of the device; and
adjustment means connected to at least one of the enclosing members for adjusting the relative position of the enclosing members and hence the closing force of the closing mechanism in the closed position.

2. The device of claim 1, wherein the adjustment means comprises a means selected from the group consisting of eccentric means and cam means that allow the closing force of the closing mechanism to be varied.

3. The device of claim 1, wherein the relative position of the enclosing members is adjusted by the adjustment means without operating the closing mechanism.

4. The device of claim 1, wherein the first axle of the closing mechanism is eccentric.

5. The device of claim 2, wherein a biasing force of the closing mechanism can be adjusted.

6. The device of claim 4, wherein the eccentric first axle of the closing mechanism is rotatable.

7. The device of claim 4, wherein the adjustment means comprise at least one geared disc member connected to the first axle of the knee lever closing mechanism.

8. The device of claim 7, wherein a rotation of the disc member enables an adjustment of a distance between the center of the first axle and the second axle, and the second axle is an axle of suspension of the upper enclosing member of the knee lever closing mechanism.

9. The device of claim 8, wherein the distance can be adjusted by less than 1 mm.

10. The device of claim 7, wherein the disc member is engaged by holding means which interlock with the geared disc member in order to prevent unintended rotation of the first axle.

11. The device of claim 7, wherein the disc member is provided with a connection means to connect a tool in order to disengage the holding means and enable a rotation of the disc member.

12. The device of claim 11, wherein the connection means is an aperture provided in the center of the disc member.

13. The device of claim 1, wherein the adjustment means are connected to the second axle, and the second axle is an axis of suspension of the upper rod of the closing mechanism.

14. The device of claim 13, wherein the adjustment means comprise at least one rotatable disc member mounted at a support member by means of a cam protruding in a radial direction.

15. The device of claim 14, wherein a plurality of protruding cams are distributed over a circumference of the disc member such that they can selectively be mounted at the support member in order to adjust the position of the axis of suspension of the knee lever closing mechanism.

16. The device of claim 15, wherein the cams protrude to a different extent in the radial direction.

17. The device of claim 16, wherein the adjustment means comprise a shaft member connected between the disc member and the knee lever closing mechanism.

18. The device of claim 17, wherein the shaft member comprises at least one circular recess concentric to the shaft member and extending in a longitudinal direction of the shaft member which abuts on a circular support member of the extraction head.

19. The device of claim 18, wherein a plurality of graded circular recesses are distributed over a circumference of the shaft member and can be selectively brought to abut on the support member.

20. The device of claim 1, wherein the capsule contains a food substance selected from the group consisting of ground coffee, soluble coffee, tea, cocoa and milk.

21. The device of claim 1, wherein the capsule is a sealed capsule which is open after liquid is inserted into the capsule due to the increased pressure in the capsule.

22. A device for preparing a beverage contained in a capsule by feeding a liquid into the capsule comprising:
a housing comprising an extraction head having an aperture for receiving a capsule in a brewing chamber of the device, the brewing chamber is defined by an upper enclosing member and a lower enclosing member;
a closing mechanism to selectively enclose the capsule by movement of the enclosing members, the enclosing members moving between an open insertion position for inserting a capsule into the brewing chamber and a closed position for enclosing the capsule within the brewing chamber, the closing mechanism comprises a knee lever comprising an upper rod and a lower rod connected to each other by a first axle, the closing mechanism further comprises a second axle extending through the upper rod and mounting the closing mechanism inside the extraction head, and a connection member integral with the second axle connects the closing mechanism to a handle exterior to the housing of the device, and
an adjuster connected to at least one of the enclosing members and so constructed and arranged to adjust the relative position of the enclosing members and thereby the closing force of the closing mechanism in the closed position.

* * * * *